United States Patent
Song et al.

(10) Patent No.: US 9,674,890 B2
(45) Date of Patent: *Jun. 6, 2017

(54) METHOD OF LINK ADAPTATION IN WIRELESS LOCAL AREA NETWORK AND APPARATUS FOR THE SAME

(75) Inventors: Kyoung Young Song, Anyang-si (KR); Dae Won Lee, Anyang-si (KR); Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 241 days.

This patent is subject to a terminal disclaimer.

(21) Appl. No.: 13/878,173

(22) PCT Filed: Oct. 7, 2011

(86) PCT No.: PCT/KR2011/007457
§ 371 (c)(1),
(2), (4) Date: Apr. 5, 2013

(87) PCT Pub. No.: WO2012/047067
PCT Pub. Date: Apr. 12, 2012

(65) Prior Publication Data
US 2013/0188630 A1   Jul. 25, 2013

Related U.S. Application Data

(60) Provisional application No. 61/391,092, filed on Oct. 8, 2010, provisional application No. 61/394,352, filed
(Continued)

(51) Int. Cl.
*H04W 84/12* (2009.01)
*H04L 1/16* (2006.01)
*H04L 1/00* (2006.01)

(52) U.S. Cl.
CPC .......... *H04W 84/12* (2013.01); *H04L 1/1671* (2013.01); *H04L 1/1685* (2013.01); *H04L 1/0025* (2013.01)

(58) Field of Classification Search
None
See application file for complete search history.

(56) References Cited

U.S. PATENT DOCUMENTS 9,019,862 B2 * 4/2015 Seok ............... H04L 1/0025
370/252
2006/0227733 A1 * 10/2006 Frederiks ........... H04W 74/02
370/310
(Continued)

OTHER PUBLICATIONS

He et al., "Link Adaptation with Combined Optimal Frame Size and Rate Selection in Error-Prone 802.11n Networks", 2008 IEEE ISWCS, pp. 733-737, Oct. 24, 2008.
(Continued)

*Primary Examiner* — Marsha D. Banks Harold
*Assistant Examiner* — Christopher Wyllie
(74) *Attorney, Agent, or Firm* — Birch, Stewart, Kolasch & Birch, LLP

(57) ABSTRACT

A method of link adaptation in a wireless local area network is provided. The method includes requesting, by a requester, modulation and coding scheme (MCS) feedback to a plurality of responders, by transmitting a MCS request (MRQ) indicator, and, receiving, by the requester, feedback frames from each of the plurality of responders, wherein each of the feedback frame comprises MCS feedback (MFB) information.

7 Claims, 12 Drawing Sheets

Related U.S. Application Data on Oct. 19, 2010, provisional application No. 61/405,199, filed on Oct. 20, 2010.

(56) References Cited

U.S. PATENT DOCUMENTS

| | | | | | |
|---|---|---|---|---|---|
| 2007/0111666 | A1* | 5/2007 | Waxman | ............... | H04B 7/0634 455/67.7 |
| 2007/0223428 | A1* | 9/2007 | Patterson | ............ | H04L 12/5895 370/338 |
| 2007/0298742 | A1* | 12/2007 | Ketchum | ............. | H04B 7/0617 455/186.1 |
| 2010/0248635 | A1* | 9/2010 | Zhang | .................. | H04B 7/0413 455/63.1 |
| 2010/0260138 | A1* | 10/2010 | Liu | ....................... | H04L 5/0023 370/330 |
| 2010/0271992 | A1* | 10/2010 | Wentink | ............. | H04B 17/0062 370/310 |
| 2011/0128947 | A1* | 6/2011 | Liu | ................... | H04L 25/03343 370/338 |
| 2012/0026909 | A1* | 2/2012 | Seok | .................... | H04B 7/0417 370/252 |
| 2012/0051246 | A1* | 3/2012 | Zhang | ................... | H04L 1/0001 370/252 |
| 2012/0063439 | A1* | 3/2012 | Seok | ................. | H04W 72/0406 370/338 |
| 2012/0147831 | A1* | 6/2012 | Golitschek | ............ | H04L 1/0026 370/329 |
| 2012/0177018 | A1* | 7/2012 | Abraham | .............. | H04L 1/0027 370/338 |
| 2014/0160964 | A1* | 6/2014 | Trainin | ................. | H04W 24/10 370/252 |

OTHER PUBLICATIONS

Wall et al., "Adaptive Multimedia Packet Transmission for Broadband IEEE 802.11 Wireless LANS", The 17th Annual IEEE International Symposium on Personal, Indoor and Mobile Radio Communications (PIMRC'06), pp. 1-5, Sep. 14, 2006.

Xia et al., "Open-Loop Link Adaptation for Next-Generation IEEE 802.11n Wireless Networks", IEEE Transactions on Vehicular Technology, vol. 58, No. 7, pp. 3713-3725, Sep. 2009.

* cited by examiner

METHOD OF LINK ADAPTATION IN WIRELESS LOCAL AREA NETWORK AND APPARATUS FOR THE SAME

CROSS REFERENCE TO RELATED APPLICATIONS

This application is the National Phase of PCT/KR2011/007457 filed on Oct. 7, 2011, which claims priority under 35 U.S.C. 119(e) to U.S. Provisional Application Nos. 61/391,092, 61/394,352 and 61/405,199 filed on Oct. 8, 2010, Oct. 19, 2010, and Oct. 20, 2010 respectively, all of which are hereby expressly incorporated by reference into the present application.

TECHNICAL FIELD

The present invention relates to wireless communications, and more particularly, to a method for link adaptation performed between an access point (AP) and a station (STA) or between one STA and another STA in a wireless local area network (WLAN) system and an apparatus supporting the method.

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate.

With the widespread use of the WLAN and the diversification of applications using the WLAN, there is a recent demand for a new WLAN system to support a higher throughput than a data processing rate supported by the IEEE 802.11n. A next-generation WLAN system supporting a very high throughput (VHT) is a next version of the IEEE 802.11n WLAN system, and is one of IEEE 802.11 WLAN systems which have recently been proposed to support a data processing rate of above 1 Gbps in a MAC service access point (SAP).

The next-generation WLAN system supports the transmission of a Multi-User Multiple Input Multiple Output (MU-MIMO) scheme in which a plurality of non-AP STAs accesses a radio channel at the same time in order to efficiently use the radio channel. According to the MU-MIMO transmission scheme, an AP can transmit a frame to one or more MIMO-paired STAs at the same time.

The AP and the plurality of MU-MIMO paired STAs may have different capabilities. In this case, a supportable bandwidth, modulation coding scheme (MCS), forward error correction (FEC), etc., may vary depending on an STA type, usage, channel environment, etc.

According to the MU-MIMO transmission scheme, a transmitter can transmit data to each of a plurality of MU-MIMO paired receivers through at least one or more spatial streams. Herein, a channel between the transmitter and a first receiver and a channel between the transmitter and a second receiver may generate mutual interference. As such, the inter-channel interference between the transmitter and the receiver may obstruct correct data transmission and reception, which may result in decrease in overall throughput of the WLAN system. Accordingly, when data is transmitted by using the MU-MIMO transmission scheme to improve throughput of the WLAN system supporting the MU-MIMO transmission scheme, there is a need to feed back a modulation and coding scheme (MCS) in sequence by considering interference between different channels.

SUMMARY OF INVENTION

Technical Problem

The present invention provides a method for link adaptation in a wireless local area network (WLAN) system supporting multi user-multiple input multiple output (MU-MIMO) transmission and an apparatus supporting the method.

Solution to Problem

In an aspect, a method of link adaptation in a wireless local area network is provided. The method includes requesting, by a requester, modulation and coding scheme (MCS) feedback to a plurality of responders, by transmitting a MCS request (MRQ) indicator, and, receiving, by the requester, feedback frames from each of the plurality of responders, wherein each of the feedback frame comprises MCS feedback (MFB) information.

The step of requesting MCS feedback may include transmitting, by the requester, physical layer convergence procedure protocol data unit (PPDU) to the plurality of responders, wherein the PPDU comprises the MRQ indicator.

The PPDU may further include first signal field comprising a group identifier indicating transmission target STA group.

The transmission target STA group may include the plurality of responders.

The MCS feedback information may be estimated by corresponding responder based on the PPDU.

The MCS feedback information may include recommended MCS, a number of spatial stream, bandwidth and SNR (signal to noise ratio) for the corresponding responder.

The feedback frames may be acknowledgement frame transmitted by the plurality of responders in response to the PPDU.

The step of requesting MCS feedback may include transmitting, by the requester, null data packet announcement (NDPA) frame to inform transmission of null data packet (NDP), and, transmitting, by the requester, the NDP to the plurality of responders.

The NDPA frame may include MCS request indicator.

The MCS feedback information may be estimated by corresponding responder based on the NDP.

The step of receiving feedback frames may include transmitting, by the requester, a feedback poll frame to each of the plurality of responders, and, receiving, by the requester, each of the feedback frames from the each of the plurality of responders in response to the feedback poll frame.

In another aspect, an wireless apparatus is provided. The apparatus includes a transceiver transmitting and receiving radio signal; and, a processor operationally coupled to the transceiver. The processor is configured for the step of: requesting modulation and coding scheme (MCS) feedback to a plurality of responders, by transmitting a MCS request (MRQ) indicator, and receiving feedback frames from each of the plurality of responders, wherein each of the feedback frame comprises MCS feedback (MFB) information.

Advantageous Effects of Invention

A link adaptation method according to an embodiment of the present invention acquires modulation and coding scheme (MCS) feedback information in sequence from multi user-multiple input multiple output (MU-MIMO) paired stations (STAs), and thus can transmit and receive data by adaptively applying an MCS on the basis of a channel environment. Therefore, data can be transmitted based on an optimal MCS even in a wireless local area network (WLAN) environment where a channel condition changes, and optionally, data can be transmitted by applying a new MCS by changing assignment of a spatial stream, thereby being able to improve throughput of a WLAN system.

MODE FOR THE INVENTION

Figure 1:
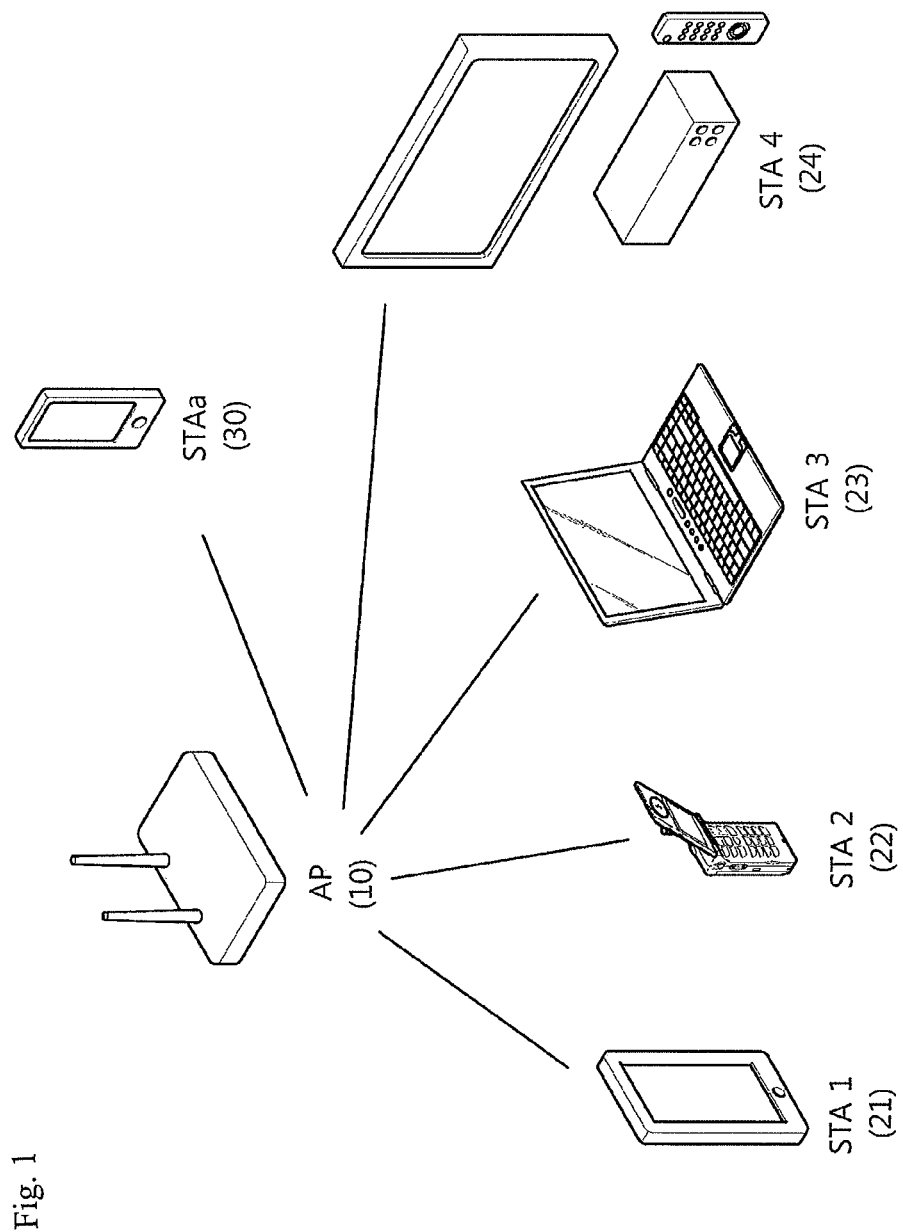
FIG. 1 is a diagram showing the configuration of a WLAN system to which embodiments of the present invention may be applied.

FIG. 1 is a diagram showing the configuration of a WLAN system to which embodiments of the present invention may be applied.

Referring to FIG. 1, A WLAN system includes one or more Basic Service Set (BSSs). The BSS is a set of stations (STAs) which can communicate with each other through successful synchronization. The BSS is not a concept indicating a specific area An infrastructure BSS includes one or more non-AP STAs STA1, STA2, STA3, STA4, and STA5, an AP (Access Point) providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to as a mobile terminal, a wireless device, a wireless transmit/receive unit (WTRU), a user equipment (UE), a mobile station (MS), a mobile subscriber unit, or simply a user. For convenience of explanation, the non-AP STA will be hereinafter referred to the STA.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller, etc.

A plurality of infrastructure BSSs including the BSS shown in FIG. 1 can be inter-connected by the use of the DS. An extended service set (ESS) is a plurality of BSSs connected by the use of the DS. APs and/or STAs included in the ESS can communicate with each another. In the same ESS, an STA can move from one BSS to another BSS while performing seamless communication.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing in addition to physical carrier sensing in which the AP and/or the STA directly senses the medium. The virtual carrier sensing is designed to compensate for a problem that can occur in medium access such as a hidden node problem. For the virtual carrier sending, the MAC of the WLAN system uses a network allocation vector (NAV). The NAV is a value transmitted by an AP and/or an STA, currently using the medium or having a right to use the medium, to anther AP or another STA to indicate a remaining time before the medium returns to an available state. Therefore, a value set to the NAV corresponds to a period reserved for the use of the medium by an AP and/or an STA transmitting a corresponding frame.

The AP and/or the STA may perform a procedure of exchanging a request to send (RTS) frame and a clear to send (CTS) frame to announce that it intends to access a medium. The RTS frame and the CTS frame include information indicating a time duration reserved for access of a radio medium required to transmit and receive an acknowledgement (ACK) frame when an actual data frame transmission and reception ACK is supported. Upon receiving an RTS frame transmitted from an AP and/or an STA intending to transmit a frame or upon receiving a CTS frame transmitted from a frame transmission target STA, another STA can be configured not to access to the medium for the time duration indicated by the information included in the RTS/CTS frame. This can be implemented by configuring an NAV for the time duration.

Unlike the conventional WLAN system, the next generation WLAN system requires a higher throughput. This is called a very high throughput (VHT). For this, the next generation WLAN system intends to support 80 MHz, contiguous 160 MHz, non-contiguous 160 MHz bandwidth transmission and/or higher bandwidth transmission. In addition, a multi user-multiple input multiple output (MU-MIMO) transmission scheme is provided for the higher throughput. In the next generation WLAN system, an AP can transmit a data frame simultaneously to at least one or more MIMO-paired STAs. In the WLAN system of FIG. 1, an AP 10 can transmit data simultaneously to an STA group including at least one or more STAs among a plurality of STAs 21, 22, 23, 24, and 30 associated with the AP 10. In this case, data transmitted to each STA can be transmitted through different spatial streams. A data frame transmitted by the AP 10 can be referred to as a physical layer convergence procedure (PLCP) protocol data unit (PPDU) generated and transmitted in a physical layer (PHY) of the WLAN system. It is assumed in the embodiment of the present invention that a transmission target STA group which is MU-MIMO paired with the AP 10 is the STA1 21, the STA2 22, the STA3 23, and the STA4 24. In this case, the spatial stream may not be allocated to a specific STA in the transmission target STA group and thus data may not be transmitted. Meanwhile, it is assumed that the STAa 30 is an STA which is associated with the AP but is not included in the transmission target STA group.

Figure 2:
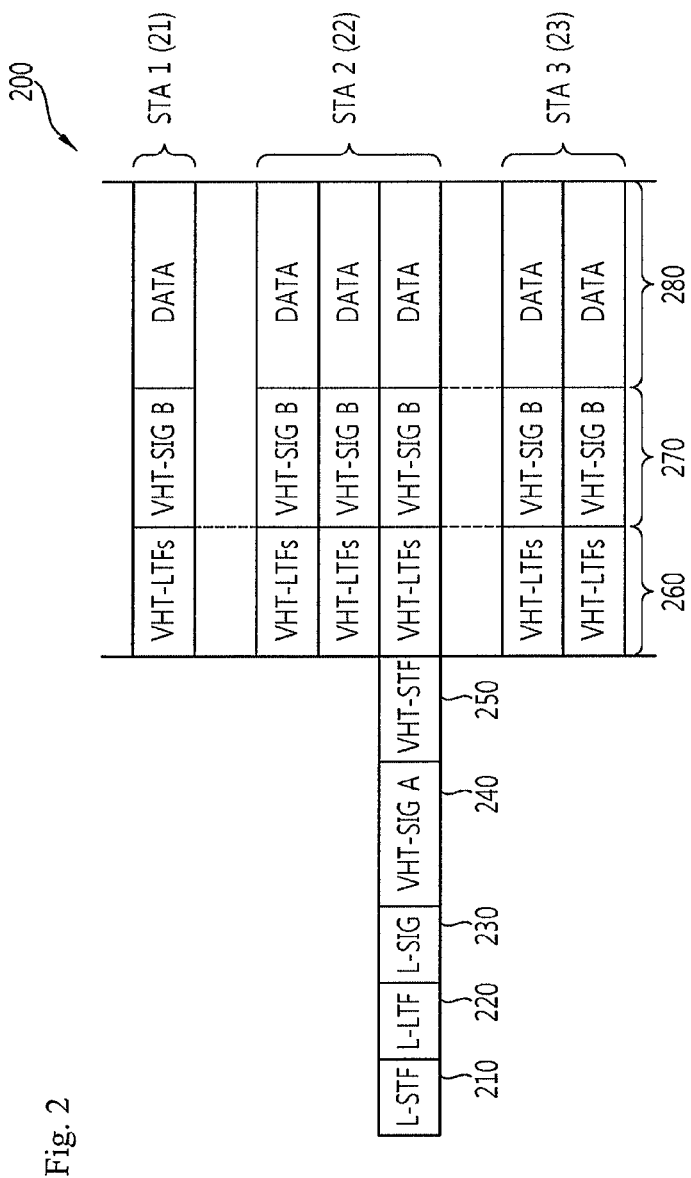
FIG. 2 shows an example of a PPDU format according to an embodiment of the present invention.

FIG. 2 shows an example of a PPDU format according to an embodiment of the present invention.

Referring to FIG. 2, a PPDU 200 includes an L-STF field 210, an L-LTF field 220, an L-SIG field 230, a VHT-SIGA field 240, a VHT-STF field 250, a VHT-LTF field 260, a VHT-SIGB field 270, and a data field 280.

A PLCP sub-layer constituting a PHY converts a PLCP service data unit (PSDU) delivered from a MAC layer into the data field 280 by appending necessary information to the PSDU, generates the PPDU 200 by appending several fields such as the L-STF field 210, the L-LTF field 220, the L-SIG field 230, the VHT-SIGA field 240, the VHT-STF field 250, the VHT-LTF field 260, the VHT-SIGB field 270, or the like, and delivers the PPDU 200 to one or more STAs through a physical medium dependent (PMD) sub-layer constituting the PHY.

The L-STF field 210 is used for frame timing acquisition, automatic gain control (AGC) convergence, coarse frequency acquisition, etc.

The L-LTF field 220 is used for channel estimation for demodulation of the L-SIG field 230 and the VHT-SIGA field 240.

The L-SIG field 230 is used when an L-STA receives the PPDU to acquire data.

The VHT-SIGA field 240 includes control information for interpreting the received PPDU 200 as common control information required for VHT-STAs which are MIMO-paired with an AP. The VHT-SIGA field 240 includes information on a spatial stream for each of the plurality of MIMO-paired STAs, bandwidth information, identification information regarding whether space time block coding (STBC) is used, a group identifier for a transmission target STA group, information regarding a spatial stream allocated to an STA included in a transmission target group STA indicated by the group identifier, information regarding a short guard interval (GI) of the transmission target STA, coding information, modulation and coding scheme (MCS) information, information indicating whether beamforming is performed, and CRC related information. Herein, the group identifier may include whether a currently used MIMO transmission method is MU-MIMO or SU-MIMO. The VHT-SIGA field 240 may be transmitted by using two OFDM symbols. In this case, a field related to a symbol that comes first can be referred to as a VHT-SIGA1, and a field related to a subsequent symbol can be referred to as a VHT-SIGA2 field.

The VHT-STF field 250 is used to improve performance of AGC estimation in MIMO transmission.

The VHT-LTF field 260 is used when the STA estimates a MIMO channel. Since the next generation WLAN system supports MU-MIMO, the VHT-LTF field 260 can be configured by the number of spatial streams on which the PPDU 200 is transmitted. In addition, when full channel sounding is supported and is performed, the number of VHT-LTFs may increase.

The VHT-SIGB field 270 includes dedicated control information required when the plurality of MIMO-paired STAs receive the PPDU 200 to acquire data. Therefore, the STA may be designed such that the VHT-SIGB field 270 is decoded only when the common control information included in the VHT-SIGB field 270 indicates that the currently received PPDU 200 is transmitted using MU-MIMO transmission. On the contrary, the STA may be designed such that the VHT-SIGB field 270 is not decoded when the common control information indicates that the currently received PPDU 200 is for a single STA (including SU-MIMO).

The VHT-SIGB field 270 includes length information of a PSDU included in the data field transmitted to each STA, MSC information, and tail related information included in the data field. Further, the VHT-SIGB field 270 includes information on encoding and rate-matching. A size of the VHT-SIGB field 270 may differ according to the MIMO transmission method (MU-MIMO or SU-MIMO) and a channel bandwidth used for PPDU transmission.

The data field 280 includes data intended to be transmitted to the STA. The data field 280 includes a service field for initializing a scrambler and a PLCP service data unit (PSDU) to which a MAC protocol data unit (MPDU) of a MAC layer is delivered, a tail field including a bit sequence required to reset a convolution encoder to a zero state, and padding bits for normalizing a length of the data field.

In the WLAN system of FIG. 1, if the AP 10 intends to transmit data to the STA1 21, the STA2 22, and the STA3 23, a PPDU can be transmitted to an STA group including the STA1 21, the STA2 22, the STA3 23, and the STA4 24. In this case, as shown in FIG. 2, no spatial stream may be assigned to the STA4 24, and a specific number of spatial streams may be assigned to each of the STA1 21, the STA2 22, and the STA3 23 and data may be transmitted according to the assignment result. In the example of FIG. 2, one spatial stream is assigned to the STA1 21, three spatial streams are assigned to the STA2 22, and two spatial streams are assigned to the STA3 23.

In order to effectively use a given channel in a WLAN system, a MU-MIMO transmission scheme needs to be utilized by scheduling several STAs simultaneously. MU-MIMO transmission implies that data can be transmitted simultaneously to a plurality of STAs, which may result in improvement in terms of overall system throughput. Herein, system performance can be further improved when optimal MCS information including spatial stream information is fed back to an AP in sequence from the respective STAs.

Open-loop link adaptation uses an acknowledgement (ACK) frame and a non-acknowledgement (NACK) frame in a data transmission and reception process in the WLAN system, and has a disadvantage in that channel information between a current AP and an STA is not fully utilized. In order to improve throughput of the WLAN system by solving this problem, a method capable of supporting closed-loop link adaptation which feeds back more accurate channel information to the AP can be taken into account. Meanwhile, a null data packet announcement (NDPA) frame—null data packet (NDP) transmission method is supported for channel sounding in the WLAN system. According to this method, a plurality of MU-MIMO paired STAs can estimate a channel on the basis of the NDP. However, the STAs can estimate the channel on the basis of not only the NDP frame but also a normal PPDU including data. By applying this to the link adaptation method, a link adaptation method based on NDPA frame—NDP transmission and a link adaptation method based on the normal PPDU can be proposed.

In the embodiments of the present invention, it is assumed that an AP is an MCS feedback (MFB) requester which requests feedback of MCS information according to the link adaptation method of the present invention and an STA is an MFB responder which responds to the request. However, the present invention is not limited thereto, and thus the MFB requester and the MFB responder may be the AP and/or the STA.

Figure 3:
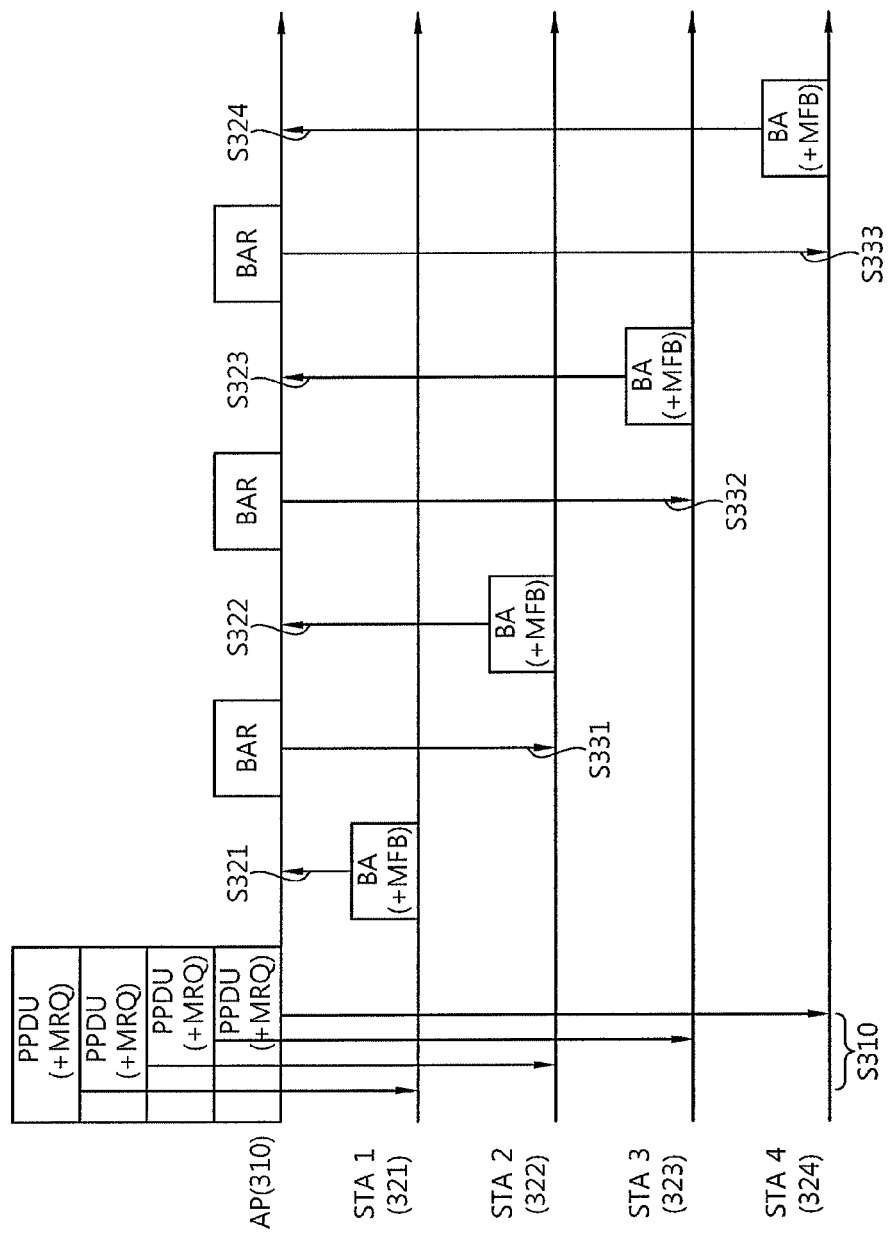
FIG. 3 is a flow diagram showing an example of a link adaptation method according to an embodiment of the present invention.

FIG. 3 is a flow diagram showing an example of a link adaptation method according to an embodiment of the present invention. It is assumed that four STAs are MU-MIMO paired with respect to an AP.

Referring to FIG. 3, an AP 310 transmits a PPDU to a plurality of MU-MIMO paired STAs 321, 322, 323, and 324 to request MCS feedback (step S310). The AP 310 can determine a beamforming matrix suitable for data transmission to each STA by utilizing channel information acquired through a channel sounding procedure before starting PPDU transmission. Therefore, the AP 310 can transmit the PPDU which is subjected to beamforming based on the determined beamforming matrix. In order to feed back an MCS to the AP in the link adaptation, the plurality of MU-MIMO paired STAs have to estimate a channel, and the channel estimation can be performed by using control information included in a VHT-LTF of the transmitted PPDU and a VHT-SIGA field of the PPDU. Examples of the control information may include a group identifier (ID) indicating a transmission target STA group, information indicating the number of spatial streams assigned to each STA, channel bandwidth information used in PPDU transmission, space time block coding (STBC) indication information, FEC coding indication information, and information indicating whether beamforming is performed.

In order to request the plurality of MU-MIMO paired STAs 321, 322, 323, and 324 to feed back the MCS, the AP 310 transmits the PPDU by including information indicating MCS request (MRQ) information into a data field of the transmitted PPDU (step S310). This can be implemented by setting an MCS subfield to 1. The MCS subfield can be included in a control field of a control wrapper frame.

A group ID is included in the VHT-SIGA field of the transmitted PPDU. The group ID indicates a target STA group to which the AP 310 intends to transmit data. It is assumed in the present embodiment that the target STA group indicates the STA1 321, the STA2 322, the STA3 323, and the STA4 324. It is assumed that the number of spatial streams transmitted to the STAs is set to 3, 2, 1, and 1, and information indicating the number of spatial streams assigned to each STA can be included in the VHT-SIGA field.

Figure 4:
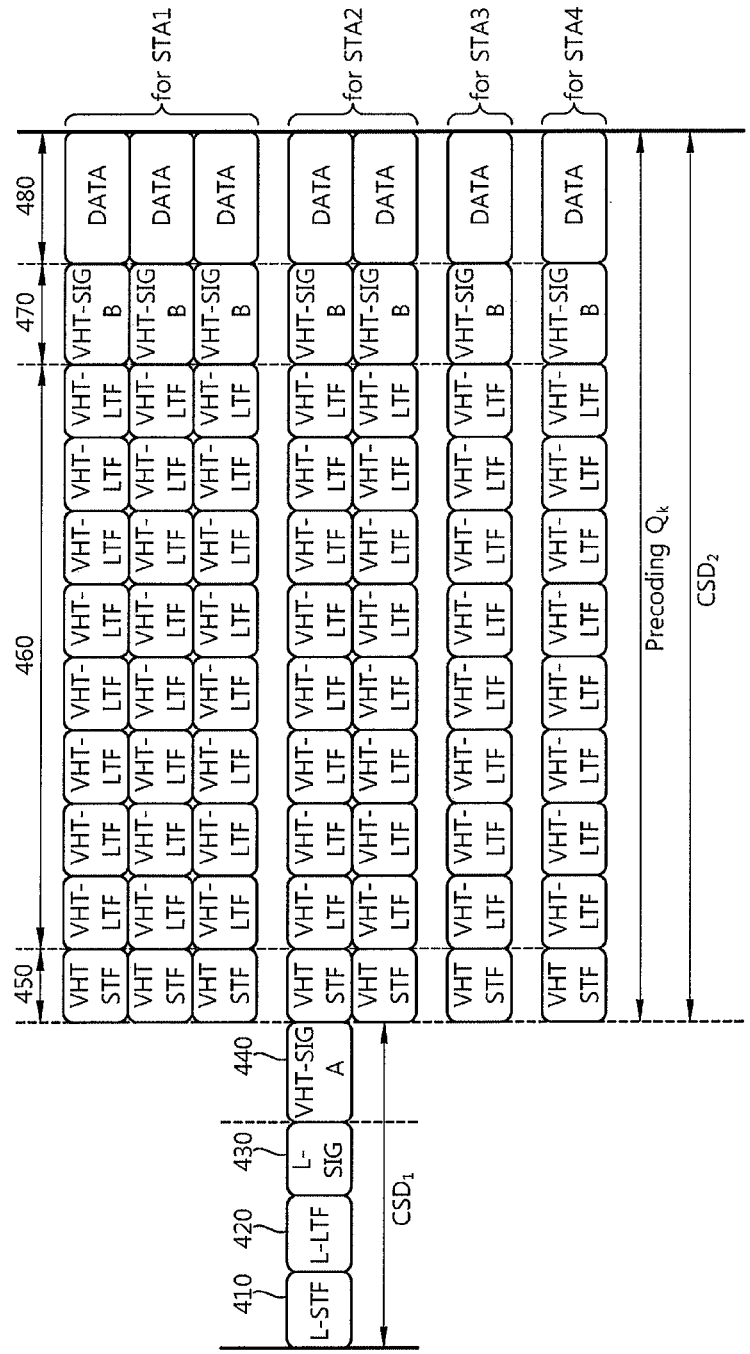
FIG. 4 shows an example of a PPDU format that can be used in an embodiment of the present invention.

FIG. 4 shows an example of a PPDU format that can be used in an embodiment of the present invention. Although 7 spatial streams are used in total in FIG. 4, it can also be configured such that 8 LTFs are required for channel estimation in a receiving STA. A VHT-LTF 460 can be transmitted by assigning 8 LTFs for each spatial stream. An L-STF field 410, an L-LTF field 420, an L-SIG field 430, and a VHT-SIGA field 440 are transmitted through all transmit (Tx) antennas by using one spatial stream. A VHT-STF field 450, a VHT-LTF field 460, a VHT-SIGB field 470, and a DATA field 480 are transmitted after applying a cyclic shift delay (CSD) and a precoding matrix. An STA1 321, an STA2 322, an STA3 323, and an STA4 324 are target STAs, and can acquire data by performing a process of demodulating the transmitted data field.

The plurality of MU-MIMO paired STAs 321, 322, 323, and 324 can estimate a channel based on the VHT-LTF 460 of the PPDU and then can acquire channel information. The STAs 321, 322, 323, and 324 can estimate an MCS by considering interference caused by other spatial streams not assigned to the corresponding STA on the basis of control information included in the VHT-SIGA field 440.

Referring back to FIG. 3, the STA1 321 transmits an ACK frame to the AP 310 as a reception confirmation in response to the PPDU transmitted by the AP 310 (step S321). The PPDU transmitted by the AP 310 may include an aggregate MAC protocol data unit (A-MPDU) which has a format of a data frame in which a plurality of data units are aggregated. Thus, the STA 321 can transmit to the AP 310 a block acknowledgement (BA) frame that can be used as a reception confirmation for each MPDU. It is assumed hereinafter that a frame transmitted by STAs as a reception confirmation is a BA frame. In this case, the STA1 321 can transmit MCS feedback (MFB) information which is a result of MCS estimation based on the received PPDU by including the information into the BA frame.

After receiving the ACK frame or BA frame including the MFB information from the STA1 321, the AP 310 transmits an ACK request frame to the STA2 322 to request the STA2 322 to transmit a reception confirmation (step S331). Since the reception confirmation of the STA can be a block ACK, the ACK request can be implemented by transmitting a block acknowledgement request (BAR) frame.

The STA2 322 transmits the BA frame including the MFB information to the AP 310 in response to the BAR frame transmitted by the AP 310 (step S322). The AP 310 transmits the BAR frame to the STA3 323 to request transmission of the BA frame (step S332). In response thereto, the STA3 323 transmits a BA frame including MFB information to the AP 310 (step S323). The AP 310 transmits a BAR frame to the STA4 324 to request BA frame transmission (step S333). In response thereto, the STA4 324 transmits a BA frame including MFB information to the AP 310 (step S324).

An order of transmitting MFB information by STAs by including the MFB information into a BA frame and an order of transmitting a BAR frame for requesting MFB information by an AP to an STA can be determined by a group ID indicating a transmission target STA group in the embodiment of the present invention. The group ID is assigned by a group ID management frame which is unicast by the AP. An order of assigning a spatial stream is specified according to a specific group ID. For example, in the PPDU format of FIG. 4, information indicating the number of spatial streams is assigned to 3, 2, 1, and 1 in the VHT-SIGA field. In this case, the order of assigning the spatial stream for the group ID indicating the transmission target STA group including the STA1, the STA2, the STA3, and the STA4 is specified to the STA1, the STA2, the STA3, and the STA4, and thus the number of specific spatial streams is sequentially assigned to each STA. The order of transmitting the MFB information to the AP can be determined according to a spatial stream assignment order specified to the group ID.

As such, the link adaptation method based on a mechanism of transmitting a PPDU including MRQ information for requesting MCS feedback and of receiving a reception confirmation message including MFB information can more effectively apply when consecutive data is transmitted many times.

Figure 5:
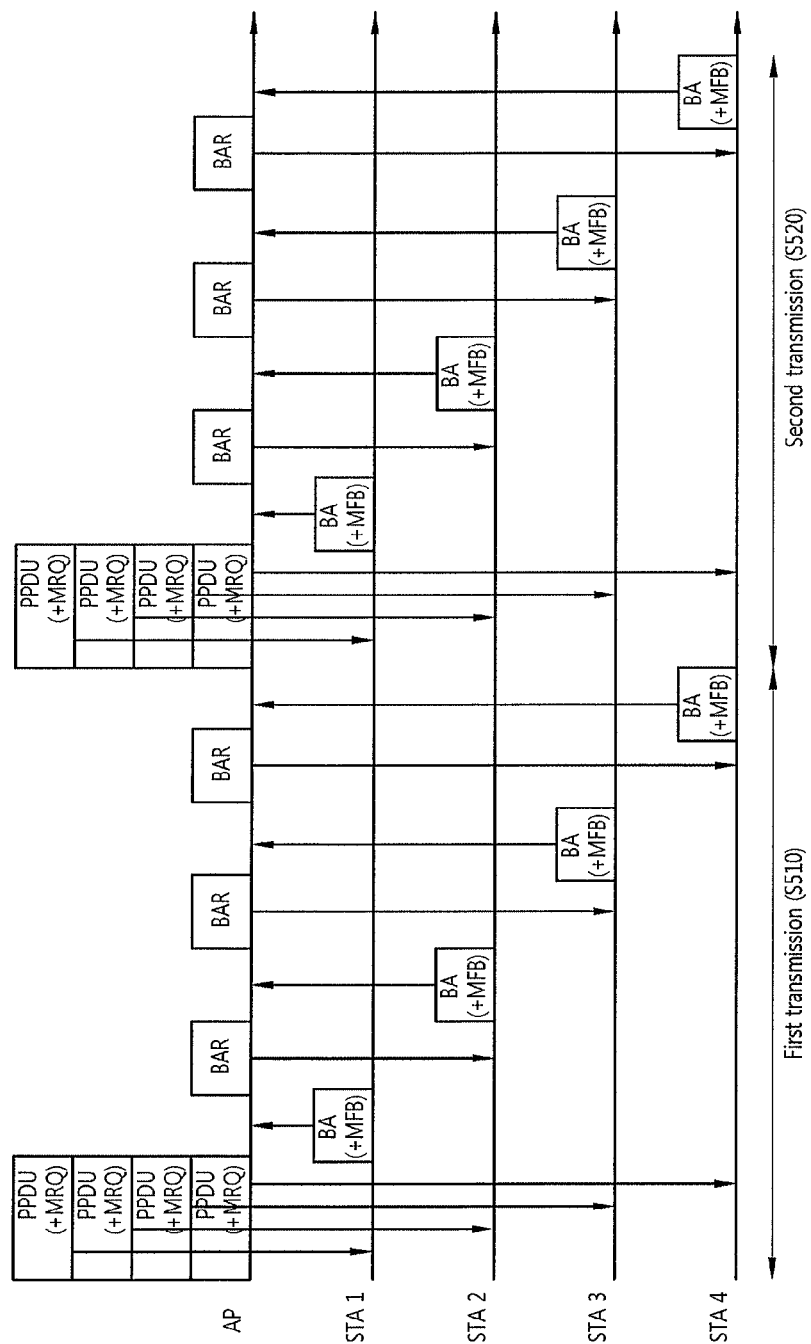
FIG. 5 is a flow diagram showing an example of a consecutive data transmission method applicable to an embodiment of the present invention.

FIG. 5 is a flow diagram showing an example of a consecutive data transmission method applicable to an embodiment of the present invention.

Referring to FIG. 5, an overall data transmission process includes a first data transmission step S510 and a second data transmission step S520 consisting of the PPDU transmission step and the reception confirmation message reception step of FIG. 3. In general, channel capacity may continuously change due to a Doppler effect. In this case, a channel rank can change at the slowest speed in general, and eigenmode vector can change at the second slowest speed. On the other hand, the most proper modulation and coding part can change at the fastest speed. Therefore, when applying the link adaptation method of the embodiment of the present invention, a new sounding process and an MCS request and MFB information reception process do not have to be performed additionally after performing the first data transmission step. That is, while transmitting a PPDU and transmitting and receiving a BA frame in the first data transmission step, MCS information that can be used afterwards can be fed back and then can be used in the second data transmission step. MFB information received through the second data transmission step can be used in a next data transmission step.

Each STA calculates a post signal to interference noise ratio (SINR) suitable for a detection and equalization scheme of a receiver. The detection and equalization scheme of the receiver may follow a method for receiver configuration such as a maximum likelihood (ML) receiver and a minimum mean-square error (MMSE) receiver. Subsequently, a packet error rate (PER) is estimated based on the SINR. The estimated PER and a target PER are compared to update MCS information, and the aforementioned process can be repeated based on the updated MCS to estimate an optimal MCS value.

According to an SINR calculation method using the MMSE receiver, a BSS in which one AP and K STAs coexist is taken into account. It is assumed in this case that the AP has M transmit (Tx) antennas, and a data stream is transmitted to an STA having N receive (Rx) antennas. A reception model for a $k^{th}$ STA can be expressed by Equation 1 below.

$$y_k = H_k x + n_k \quad [\text{Math.1}]$$

Herein, $H_k$ denotes a channel matrix between the AP and the $k^{th}$ STA.

$$x = \sum_{k=1}^{K} W_k s_k$$

is a Tx signal and is defined as a sum of products of a precoding matrix $W_k$ and a signal $s_k$ of the $k^{th}$ STA. An average power at a transmitter is limited to P. That is, $E[x^H x] \leq P$.

$n_k$ denotes a circularly symmetric complex additive Gaussian noise of which an average is 0 and a variance is $\sigma^2$.

Equation 1 above can be developed to Equation 2 below.

$$y_k = H_k W_k s_k + \sum_{j \neq k} H_k W_j s_j + n_k \quad [\text{Math. 2}]$$

Herein, a second term represents multi-user interference. According to an information theory, each STA can decode S spatial streams, where S is less than or equal to N, that is, the number of Rx antennas. In this case, if it is assumed that N=1, an effective SINR of the $k^{th}$ STA can be expressed by Equation 3 below.

$$SINR_k = \frac{|h_k w_k|}{\sum_{j \neq k} |h_k w_j|^2 + K\sigma^2/P} \quad [\text{Math. 3}]$$

Unlike the embodiment of FIG. 3 to FIG. 5 in which a channel is estimated by using a VHT-LTF included in a PPDU for data transmission, full channel information can be fed back to the AP by using an NDP. Hereinafter, a link adaptation method using the NDP will be described.

Figure 6:
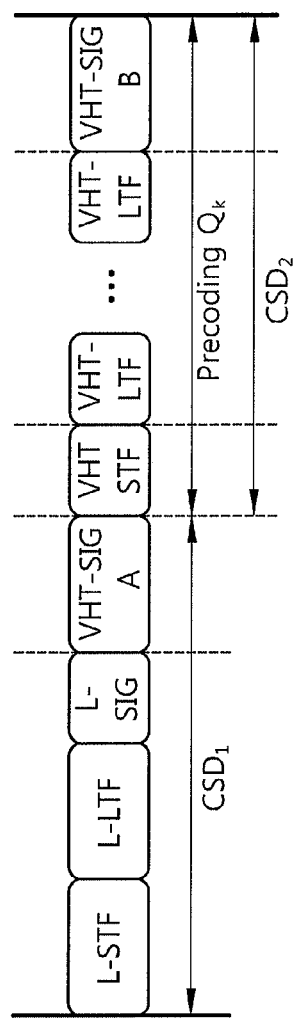
FIG. 6 shows a format of an NDP applicable to an embodiment of the present invention.

FIG. 6 shows a format of an NDP applicable to an embodiment of the present invention.

Referring to FIG. 6, the NDP has a configuration in which a data field is excluded from the PPDU format of FIG. 2.

In channel sounding, information capable of identifying STAs can be provided so that a specific STA or a plurality of STAs can estimate and feed back an MCS by using the NDP. In addition, information related to a spatial stream received by the STAs can also be provided. Examples of information transmitted by the AP may include a group ID, a partial association ID (AID), and information indicating the number of spatial streams assigned for each STA of a transmission target STA group indicated by the group ID.

Figure 7:
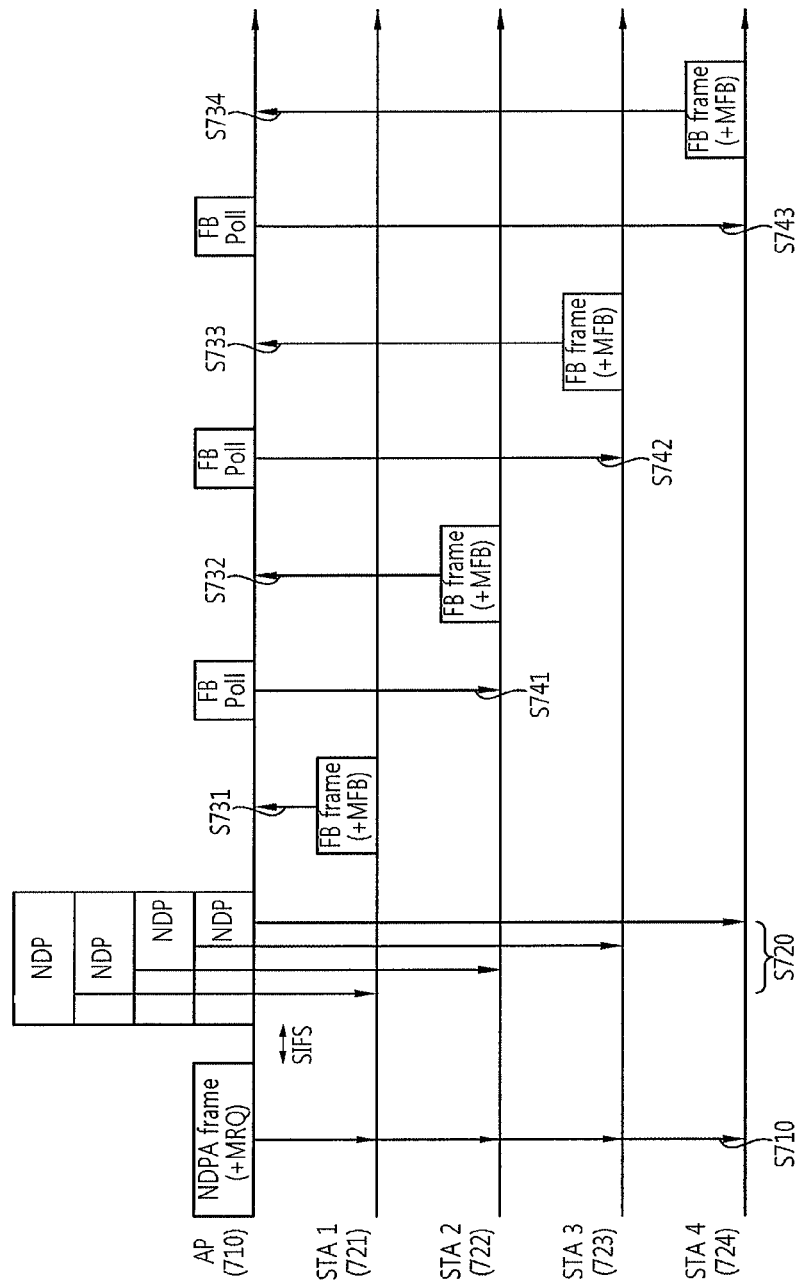
FIG. 7 is a flow diagram showing another example of a link adaptation method according to an embodiment of the present invention.

FIG. 7 is a flow diagram showing another example of a link adaptation method according to an embodiment of the present invention.

Referring to FIG. 7, an AP 710 transmits to a plurality of MU-MIMO paired STAs 721, 722, 723, and 724 an NDP announcement message for reporting that an NDP will be transmitted (step S710). Transmitting of the NDP announcement message may be broadcasting of a null data packet announcement (NDPA) frame. Unlike in FIG. 7, information for reporting that the NDP will be transmitted can be signaled by using a normal PPDU. A method of providing information required for MCS feedback may vary depending on how to transmit the NDP announcement message. This will be described below.

The AP 710 transmits the NDP to the plurality of MU-MIMO paired STAs 721, 722, 723, and 724 (step S720). The NDP may have the format of FIG. 6, and a structure of a VHT-LTF may vary depending on the number of STAs that intend to request MCS feedback and the total number of spatial streams assigned thereto.

The STAs 721, 722, 723, and 724 receive an NDPA frame and confirm that information for instructing a request of MCS estimation is included in the NDPA frame, and upon receiving the NDP, estimate an MCS on the basis of the received NDP. That is, the MCS can be estimated on the basis of control information included in a VHT-SIGA field of the NDP. In this case, the STAs 721, 722, 723, and 724 can estimate the MCS under the assumption that the AP 710 has performed single user-multiple input multiple output (SU-MIMO) transmission. This is because a group ID included in the NDP frame can indicate SU transmission. Since the AP 710 has transmitted the NDP simultaneously to all of the STAs 721, 722, 723, and 724, each STA estimates the MCS by considering interference caused by a spatial stream assigned for an NDP to be transmitted to another STA.

The STA1 721 transmits a feedback (FB) frame including MFB information to the AP 710 as a reception confirmation in response to the NDP transmitted by the AP 710 (step S731). The AP 710 receives the FB frame including the MFB information from the STA1 721, and then transmits an FB poll frame to the STA2 722 to request the STA2 722 to transmit a feedback (step S741). The STA2 722 transmits the FB frame including the MFB information to the AP 710 in response to the FB frame transmitted by the AP 710 (step S732). The AP 710 transmits the FB poll frame to request the STA3 723 to transmit the FB frame (step S742). In response thereto, the STA3 723 transmits the FB frame including the MFB information to the AP 710 (step S733). The AP 710 transmits the FB poll frame to request the STA4 724 to transmit the feedback frame (step S743). In response thereto, the STA4 724 transmits the FB frame including the MFB information to the AP 710 (step S734).

Each FB poll frame may include spatial stream information which is required by each STA to estimate and feed back the MCS. The STA receives the FB poll frame, and by using spatial stream information included therein, can know a specific spatial stream corresponding to a set of spatial streams for data reception and a specific spatial stream for another STA. Accordingly, the MCS can be estimated and fed back by considering interference that can be generated by MU-MIMO transmission.

The NDP has a format in which a data field is excluded from the PPDU format. Therefore, since a MAC header does not exist, there is no field indicating a source address, a destination address, etc. Transmitting of an NDP announcement message is for reporting information required for MCS estimation to the STA by allowing the STA to receive the NDP. However, since the NDP announcement message basically corresponds to a protocol for sounding, information indicating MCS estimation must be transmitted together to allow the STA to perform MCS estimation and to instruct feedback of the MCS estimation result. As an example of transmission of the NDP announcement message, the NDPA frame can be transmitted as described in the afore-mentioned example.

In the transmitting of the NDP announcement message, a normal PPDU may be transmitted in addition to the NDPA frame. When transmission is performed such that information indicating that a corresponding frame is an NDP announcement message and indication information for requesting MCS estimation are included in a control field of a MAC header in the PPDU, the STA can receive the PPDU and an NDP and then estimate an MCS on the basis of the received PPDU and NDP.

Figure 8:
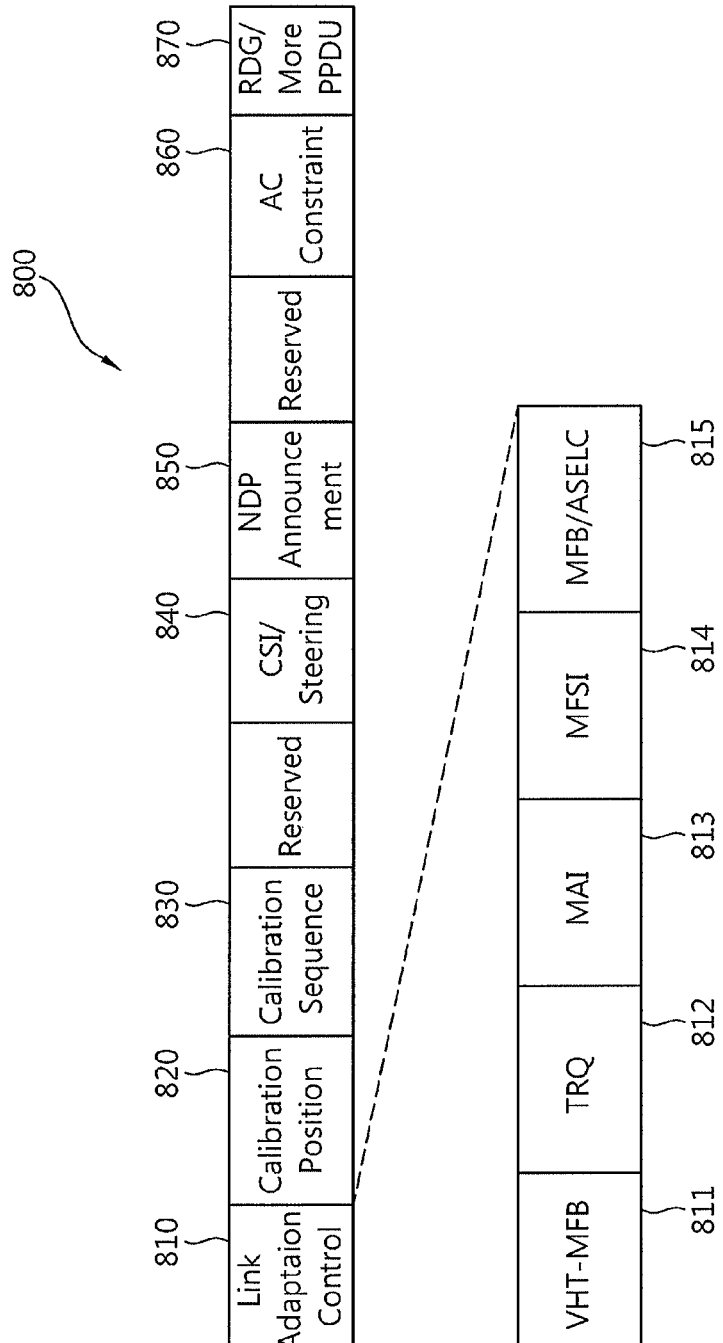
FIG. 8 shows a control field format according to an embodiment of the present invention.

FIG. 8 shows a control field format according to an embodiment of the present invention.

Referring to FIG. 8, a control field 800 included in a MAC header includes a link adaptation control subfield 810, a calibration position subfield 820, a calibration sequence subfield 830, a channel state information (CSI)/steering subfield 840, a null data packet (NDP) announcement subfield 850, an access category (AC) constraint subfield 860, and an RDG/more PPDU subfield 870.

The link adaptation control subfield 810 includes a VHT-MFB (MCS feedback) subfield 811, a TRQ (training request) subfield 812, a MAI (MCS request(MRQ) or ASEL (antenna selection) Indication) subfield 813, a MFSI (MCAS feedback sequence identifier) subfield 814, and a MFB/ASELC (MCS feedback and antenna selection command/data) subfield 815. The VHT-MFB subfield 811 is configured to indicate whether information included in the link adaptation control subfield 810 is MCS feedback related information of a next generation WLAN system. The TRQ subfield 812 includes information for requesting sounding frame transmission to a sounding responder. The MAI subfield 813 can be interpreted as indication information for requesting MCS feedback or information indicating that MFB/ASELC subfield 815 includes antenna selection indication information. The MAI subfield 813 includes an MCS request (MRQ) indication bit and can indicate whether to request MCS feedback by setting a value of the indication bit. The MFSI subfield 814 includes identifier information of an MCS feedback sequence. The MFB/ASELC subfield 815 includes MFB information or antenna selection indication information.

The calibration position subfield 820 and the calibration sequence subfield 830 include a position of calibration sounding exchange sequence and indication information of a calibration sequence. The CSI/steering subfield 840 indicates information indicating a feedback type. The AC constraint subfield 860 indicates whether a mapped access category is constraint to one access category.

The NDP announcement subfield 850 can be configured to NDP announcement indication information for reporting that an NDP will be transmitted subsequently to a currently transmitted PPDU. The NDP announcement subfield 850 can be configured with a field having a size of one bit. Upon receiving the PPDU, an STA can confirm whether the PPDU is an NDPA frame by using a value of the NDP announcement subfield 850.

The PPDU including MCS feedback request information and information indicating the NDP announcement message must include information on an NDP transmitted to MU-MIMO paired STAs. A group ID of a VHT-SIGA of the PPDU is configured to indicate the MU-MIMO paired STAs, and information indicating the number of spatial streams of the VHT-SIGA is configured to indicate the number of spatial streams assigned to each STA. The NDP has a normal PPDU format in which a data field is omitted, and thus the VHT-SIGA field can include a group ID and information indicating the number of spatial streams. However, in the NDP, the group ID is set to a value indicating single user (SU) transmission. Therefore, information that can be acquired by receiving the NDP is information indicating the number of spatial streams assigned to each STA and MCS information for each spatial stream. The MCS for each spatial stream may be included in a VHT-SIGB field. However, in the MCS information included in the normal PPDU, an MCS for each spatial stream is dependent on the group ID. Therefore, in case of the NDP, the MCS information included in the VHT-SIGB field can be allowed to set an MCS value for the MU-MIMO paired STAs irrespective of the group ID value. Each STA can know that it involves in transmission with respect to an AP by using the group ID of the PPDU transmitted for NDP announcement message transmission, and if spatial stream information included in the PPDU is identical to spatial stream information included in the NDP, can know the number of spatial streams assigned to each STA. Subsequently, by interpreting the VHT-SIGB field of the NDP, MCS information for each spatial stream can be acquired. The STA can estimate an optimal MCS by considering interference caused by another STA on the basis of control information acquired through the afore-mentioned process, and can feed back the estimated MCS to the AP.

The control field format of FIG. 8 can be included in a feedback frame transmitted by each STA. The feedback frame includes MFB information. The MFB information can be included in the MFB/ASELC subfield 815 of the control field.

The NDPA frame used in the embodiment of FIG. 7 can also include the control field format of FIG. 8, include information for requesting MCS feedback by setting the MAI subfield 813, and include NDP announcement indication information by setting the NDP announcement subfield 850. However, the PPDU is transmitted by performing beamforming in the aforementioned embodiment, whereas the NDPA frame is transmitted in a broadcasting manner. After transmitting the NDPA frame, the NDP is transmitted to each STA by performing beamforming, and each of the STAs can perform MCS estimation on the basis of the NDP and can feed back MFB information to the AP.

An original purpose of the NDP lies in channel sounding. The purpose of channel sounding lies in that the AP performs suitable beamforming by using a well-estimated channel matrix and transmits data to a target STA. If a significant change occurs in the channel, a new precoding matrix must be obtained. A series of such processes can be performed by using the NDP. Therefore, in order to apply the NDP extendedly up to link adaptation, the frame control field can be allowed to indicate whether to use the NDP in channel sounding or link adaptation.

The link adaptation method using the NDP can effectively apply to a next generation WLAN system supporting the MIMO transmission scheme. A change may occur in a spatial stream such as a case where there is no need to assign the spatial stream since it is not necessary to transmit data to any STA while transmitting data from the AP to the STA. In this case, a method of assigning a spatial stream which is no longer used to another STA can be used. In addition thereto, since power allocation that can be used in data transmission may differ, the AP needs to generate a beamforming matrix for a new channel. In this case, channel sounding and link adaptation can be properly performed by using the NDP. This can refer to FIG. 9.

Figure 9:
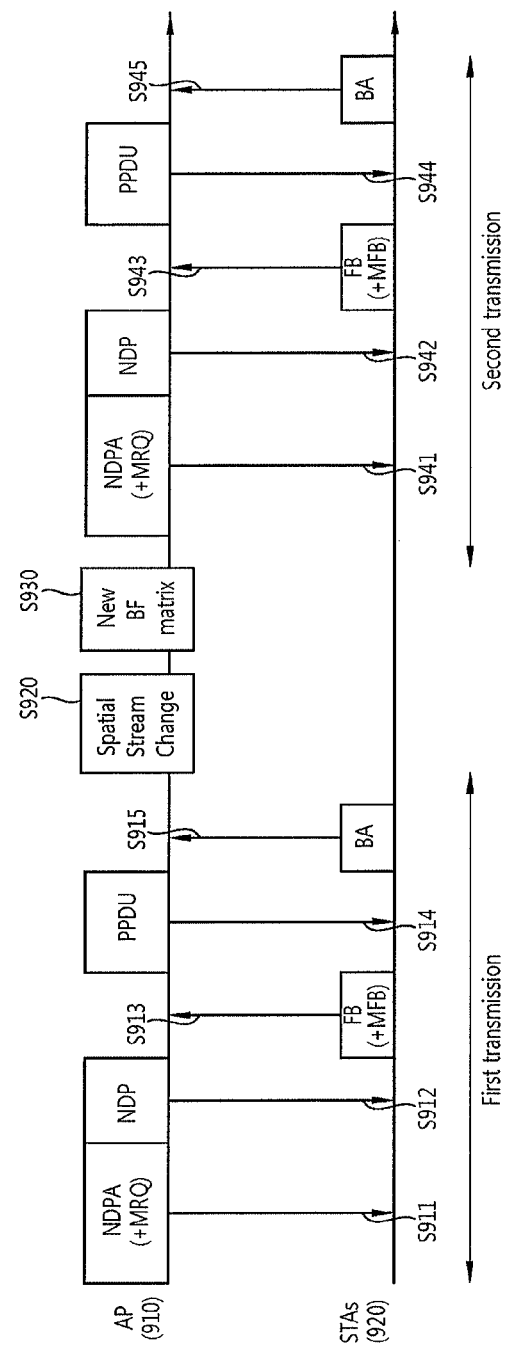
FIG. 9 is a flow diagram showing an example of a link adaptation method according to an embodiment of the present invention.

FIG. 9 is a flow diagram showing an example of a link adaptation method according to an embodiment of the present invention. It is assumed in FIG. 9 that, in a BSS including an AP having four Tx antennas and an STA having two Rx antennas, the AP transmits four spatial streams to three STAs.

Referring to FIG. 9, in a first transmission period, an AP 910 transmits an NDPA message to MU-MIMO paired STAs 920 (step S911), and then transmits an NDP (step S912). The NDP frame is transmitted by performing beamforming. For example, among the STAs 920, beamforming can be performed such that one spatial stream is assigned to an STA1 and an STA2, and two spatial streams are assigned to an STA3. The STAs 920 transmit a feedback frame including MFB information in sequence to the AP 910 (step S913). Transmitting of the feedback frame to the AP 910 can refer to the aforementioned embodiment.

The AP 910 transmits a PPDU including data to the STAs 920 by using the MU-MIMO transmission scheme (step S914). The PPDU is subjected to beamforming similarly to the NDP, and can be transmitted by using one spatial stream for the STA1 and the STA2 and by using two spatial streams for the STA3.

Upon receiving the PPDU, the STAs 920 transmit an ACK frame in sequence to the AP 910 (step S915). If the PPDU includes an A-MPDU, the ACK frame may be a BA frame. Transmitting of the ACK frame may refer to the aforementioned embodiment.

Before the AP 910 intends to transmit a PPDU again to the STAs 920, a condition of a spatial stream to be used may change (step S920). That is, if the AP 910 entirely transmits data to the STA3 during the first transmission period, the AP 910 can regulate a beamforming method such that data is transmitted by assigning spatial streams assigned to the STA3 to the STA1 and/or the STA2.

The AP 910 acquires a new beamforming matrix (step S930). Since the AP 910 knows a channel condition through previous channel sounding, it is not difficult to acquire a precoding matrix suitable for new transmission.

In a second transmission period, the AP 910 transmits an NDP announcement message to the STAs 920 by using the new beamforming matrix (step S941), and transmits a beamformed NDP (step S942). The STAs 920 can estimate an optimal MCS by considering interference caused by a spatial stream and can feed back the estimated MCS to the AP 910 (step S943). In this case, since there is no spatial stream assigned to the STA3, feedback frame transmission can be performed by the STA1 and the STA2. The AP 910 can transmit a PPDU to the STAs 920 by using a new MCS fed back from the STAs 920 (step S944). In this case, since two spatial streams are assigned only to the STA1 and the STA2, there is no data actually transmitted to the STA3. The STAs 920 transmits an ACK frame to the AP 910 in response to the PPDU (step S945).

In addition, if there is a change in a channel between the AP and the STA, MCS estimation performed in each STA may not significantly contribute to improvement of overall system throughput. The STA can recognize such a situation from a channel link change through channel estimation, and report this to the AP. That is, reporting may be required so that the AP requests channel sounding instead of allowing the STA to feed back the MCS. In this case, the AP can perform downlink channel sounding. A beamforming matrix for a new channel can be obtained in this case by reporting that an NDP will be used for channel sounding in a frame control field. Therefore, open-loop link adaptation and closed-loop link adaptation can be usefully utilized even if there is a change in layering. This can refer to FIG. 10.

Figure 10:
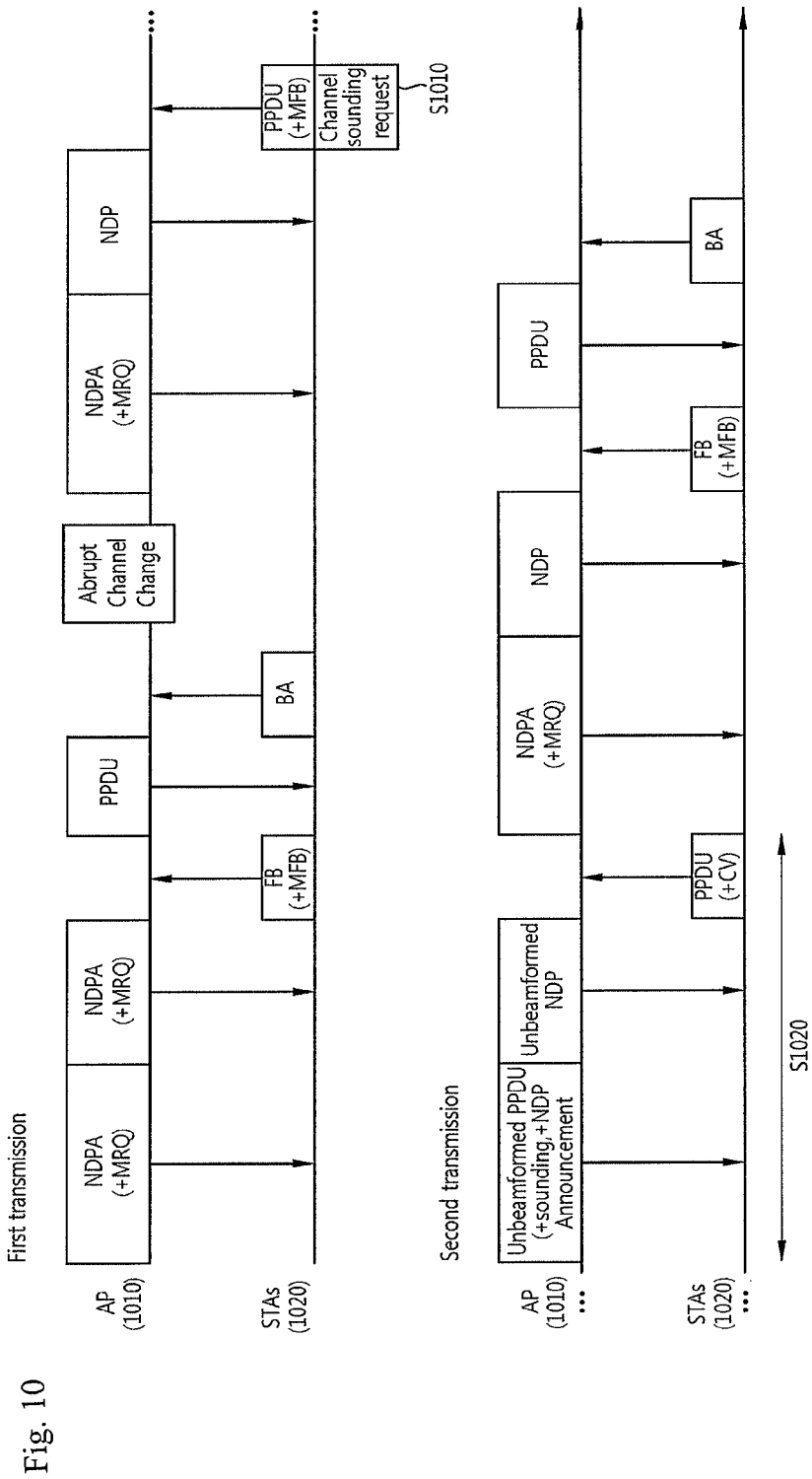
FIG. 10 is a flow diagram showing another example of a link adaptation method according to an embodiment of the present invention.

FIG. 10 is a flow diagram showing another example of a link adaptation method according to an embodiment of the present invention.

This is a process of channel sounding and open-loop link adaptation in a case where there is a significant change in a channel. In a first transmission period, an AP 1010 acquires MCS feedback information through a link adaptation procedure based on an NDP with respect to STAs 1020, and transmits a PPDU to the STAs 1020 according to the acquired MCS feedback information. The STAs 1020 transmit an ACK frame to the AP 1010 in response to the PPDU. Thereafter, when there is a change in a channel or in the number of data streams (step S1010), the STA can recognize the change and can propose new channel sounding to the AP while performing link adaptation (step S1010).

In a second transmission period, the AP 1010 performs a channel sounding procedure based on an NDP with respect to the STAs 1020 (step S1020), re-regulates the number of spatial streams according to a new precoding matrix obtained as a result of the channel sounding, and if space time block coding (STBC) is applied, transmits a PPDU to the STAs 1020 by regulating the number of space time streams. The STAs 1020 transmit an ACK frame to the AP 1010 in response to the PPDU.

Meanwhile, similarly to a case where movement of the STA results in a change of an optimal MCS, when an STA slightly moves near an original position in one BSS, an optimal MCS may change whereas a channel link and a channel eigenmode do not change. When it is determined that the AP directly uses a beamforming matrix in a previous situation by recognizing a channel change by the use of an NDP before data transmission, the STA can feed back MCS information to the AP in a current channel situation. This can refer to FIG. 11.

Figure 11:
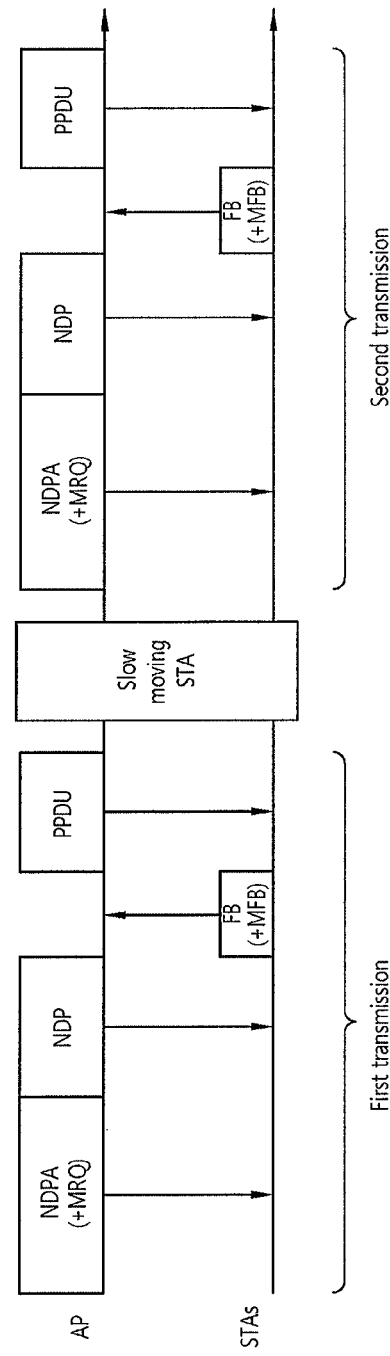
FIG. 11 is a flow diagram showing another example of a link adaptation method applicable to an embodiment of the present invention.

FIG. 11 is a flow diagram showing another example of a link adaptation method applicable to an embodiment of the present invention.

Referring to FIG. 11, after a first transmission period elapses, an STA moves slowly or moves slightly. This can be seen as a case where only an optimal MCS changes without a change in an eigenmode or a channel rank between an AP and the STA. By using MFB information received from STAs in the first transmission period, the AP transmits a PPDU including data to the STAs. If a slight change occurs in the STAs, the optimal MCS may change. When a channel is estimated in a second transmission period, if there is no significant change in the channel, the STA transmits only the MFB information to the AP, and the AP transmits the PPDU including data to the STAs by using MCS information which is received as a feedback.

Meanwhile, in a link adaptation method using an NDP, a method of transmitting information for MCS estimation of STAs by including the information into a VHT-SIGA field of the NDP can be proposed. Although a group ID included in the VHT-SIGA is generally set to a value indicating SU transmission, it is exceptionally set to a value indicating a target STA group of MU-MIMO transmission in the present embodiment.

A group ID and information indicating the number of spatial streams assigned to each STA are included in the VHT-SIGA field of the NDP transmitted by the AP. In this case, when transmitting an NDPA frame for a NDP announcement message before NDP transmission or an PPDU including NDP announcement information, the group ID and the information indicating the number of spatial streams included in the VHT-SIGA field of the frame may be equal to a value which is set in the NDP. A method of transmitting the NDPA frame or the PPDU may directly use broadcasting or unicasting. STAs can estimate an MCS by using the NDP and can feed back MFB information to the AP.

Figure 12:
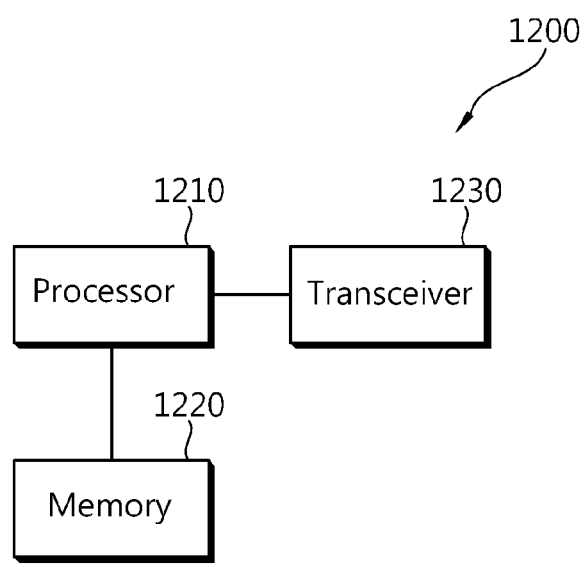
FIG. 12 is a block diagram showing a wireless apparatus to which an embodiment of the present invention is applicable.

FIG. 12 is a block diagram showing a wireless apparatus to which an embodiment of the present invention is applicable.

The wireless apparatus 1200 includes a processor 1210, memory 1220, and a transceiver 1230. The transceiver 1230 transmits and/or receives a radio signal and implements the physical layer of the IEEE 802.11 standard. The processor 1210 is operatively coupled to the transceiver 1230 and implements the MAC layer and the PHY layer of the IEEE 802.11 standard. The processor 1210 can be configured to generate and transmit an NDPA frame, an NDP, a feedback frame, and a feedback poll frame proposed in the present invention. Further, the processor 1210 can be configured to acquire control information by receiving the transmitted frame and interpreting a field value included therein. Furthermore, the processor 1210 can receive a frame and can estimate an MCS on the basis of control information included in the frame. The processor can be configured to implement the embodiment of the present invention described above with reference to FIG. 2 to FIG. 11.

The processor 1210 and/or the transceiver 1230 may include an application-specific integrated circuit (ASIC), a separate chipset, a logic circuit, and/or a data processing unit. When the embodiment of the present invention is implemented in software, the aforementioned methods can be implemented with a module (i.e., process, function, etc.) for performing the aforementioned functions. The module may be stored in the memory 1220 and may be performed by the processor 1210. The memory 1220 may be located inside or outside the processor 1210, and may be coupled to the processor 1210 by using various well-known means.

Although the present invention has been particularly shown and described with reference to exemplary embodiments thereof, it will be understood by those skilled in the art that various changes in form and details may be made therein without departing from the spirit and scope of the invention as defined by the appended claims.

The invention claimed is:

1. A method for link adaptation in a wireless local area network, the method comprising:

receiving, by a responding device, a control frame from a requesting device, wherein the control frame is a first type frame or a second type frame, wherein the first type frame is a null data packet announcement (NDPA) frame carrying a request field, wherein the second type frame is a physical layer protocol data unit (PPDU) carrying the request field and a data field, wherein the request field is used for requesting feedback from the responding device, wherein the request field is set to '1' when requesting the feedback, and wherein the NDPA frame includes an identifier identifying the responding device;

estimating, by the responding device, a recommended feedback including a recommended modulation and coding scheme (MCS) by using a null data packet (NDP) frame received from the requesting device or the PPDU, wherein the NDP frame follows the NDPA frame, wherein if the control frame is the first type frame the recommended feedback is estimated by using the NDP frame, wherein if the control frame is the second type frame the recommended feedback is estimated by using a group ID and a number of spatial streams used for the PPDU;

configuring, by the responding device, a first feedback frame including the recommended feedback; and transmitting, by the responding device, the first feedback frame.

2. The method of claim 1, wherein the control frame is broadcast to the responding device.

3. The method of claim 2, further comprising:

receiving, by the responding device, a feedback poll frame to the requesting device after transmitting the first feedback frame; and transmitting, by the responding device, a second feedback frame to the requesting device.

4. The method of claim 1, wherein the requesting device is an access point.

5. A wireless device configured for link adaptation in a wireless local area network, the wireless device comprising:

a transceiver configured to transmit and receive radio signals; and a processor operably coupled to the transceiver and configured to:

receive, via the transceiver, a control frame from a requesting device, wherein the control frame is a first type frame or a second type frame, wherein the first type frame is a null data packet announcement (NDPA) frame carrying a request field and a data field, wherein the second type frame is a physical layer protocol data unit (PPDU) carrying the request field, wherein the request field is used for requesting feedback from the responding device, wherein the request field is set to '1' when requesting the feedback, and wherein the NDPA frame includes an identifier identifying the responding device, estimate a recommended feedback including a recommended modulation and coding scheme (MCS) by using a null data packet (NDP) frame received from the requesting device or the PPDU, wherein the NDP frame follows the NDPA frame, wherein if the control frame is the first type frame the recommended feedback is estimated by using the NDP frame, wherein if the control frame is the second type frame the recommended feedback is estimated by using a group ID and a number of spatial streams used for the PPDU, configure a first feedback frame as a response to the NDPA frame including the recommended feedback, and transmit, via the transceiver, the first feedback frame.

6. The wireless device of claim 5, wherein the control frame is broadcast to the responding device.

7. The wireless device of claim 6, wherein the processor is further configured to:

receive a feedback poll frame to the requesting device after transmitting the first feedback frame, and transmit a second feedback frame to the requesting device.

* * * * *